Dec. 3, 1957  W. R. POLANIN  2,815,095
ROTOR BRAKE SUSPENSION ARRANGEMENT
Filed Oct. 29, 1953  2 Sheets-Sheet 1
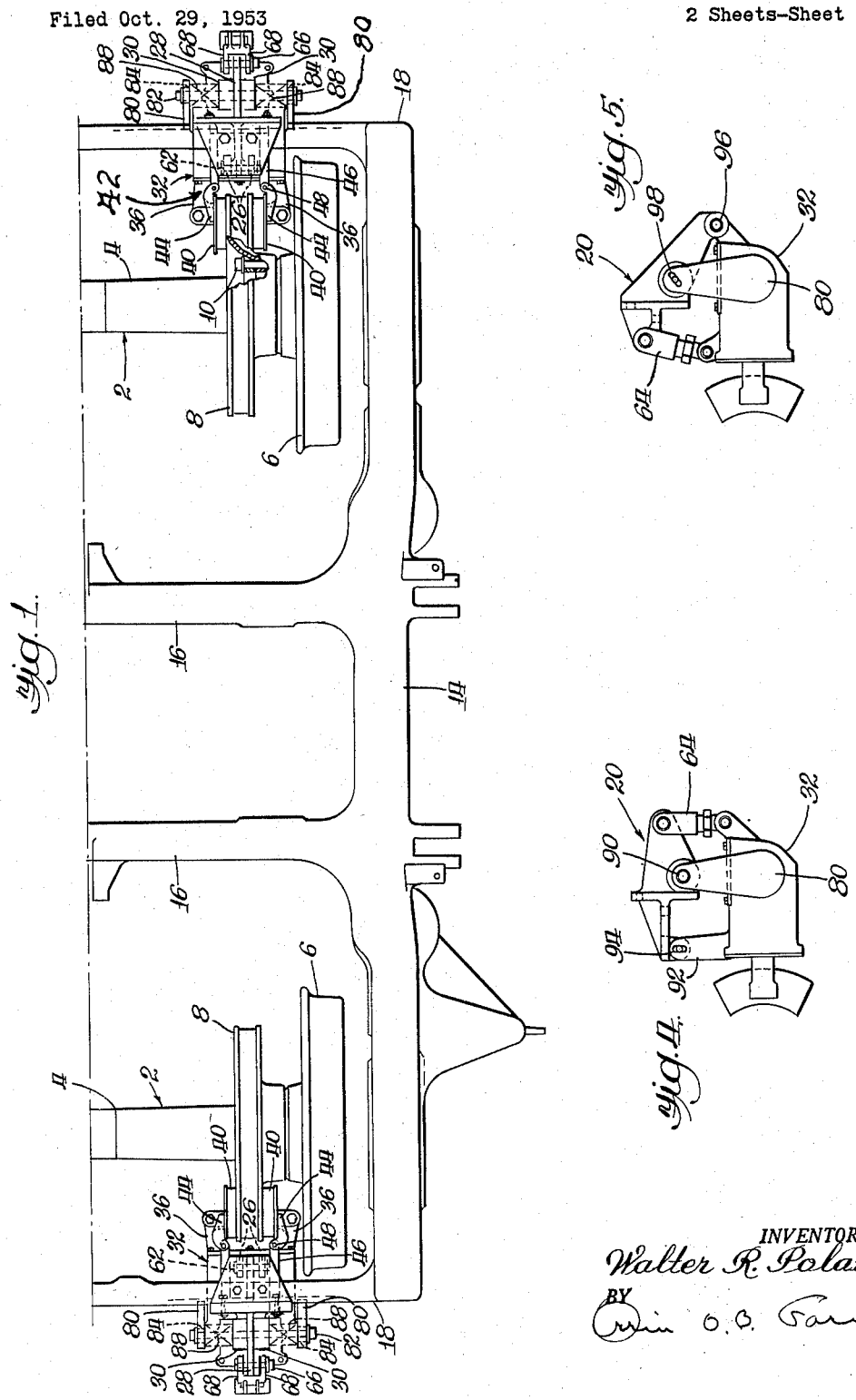
INVENTOR.
Walter R. Polanin
BY
Atty.

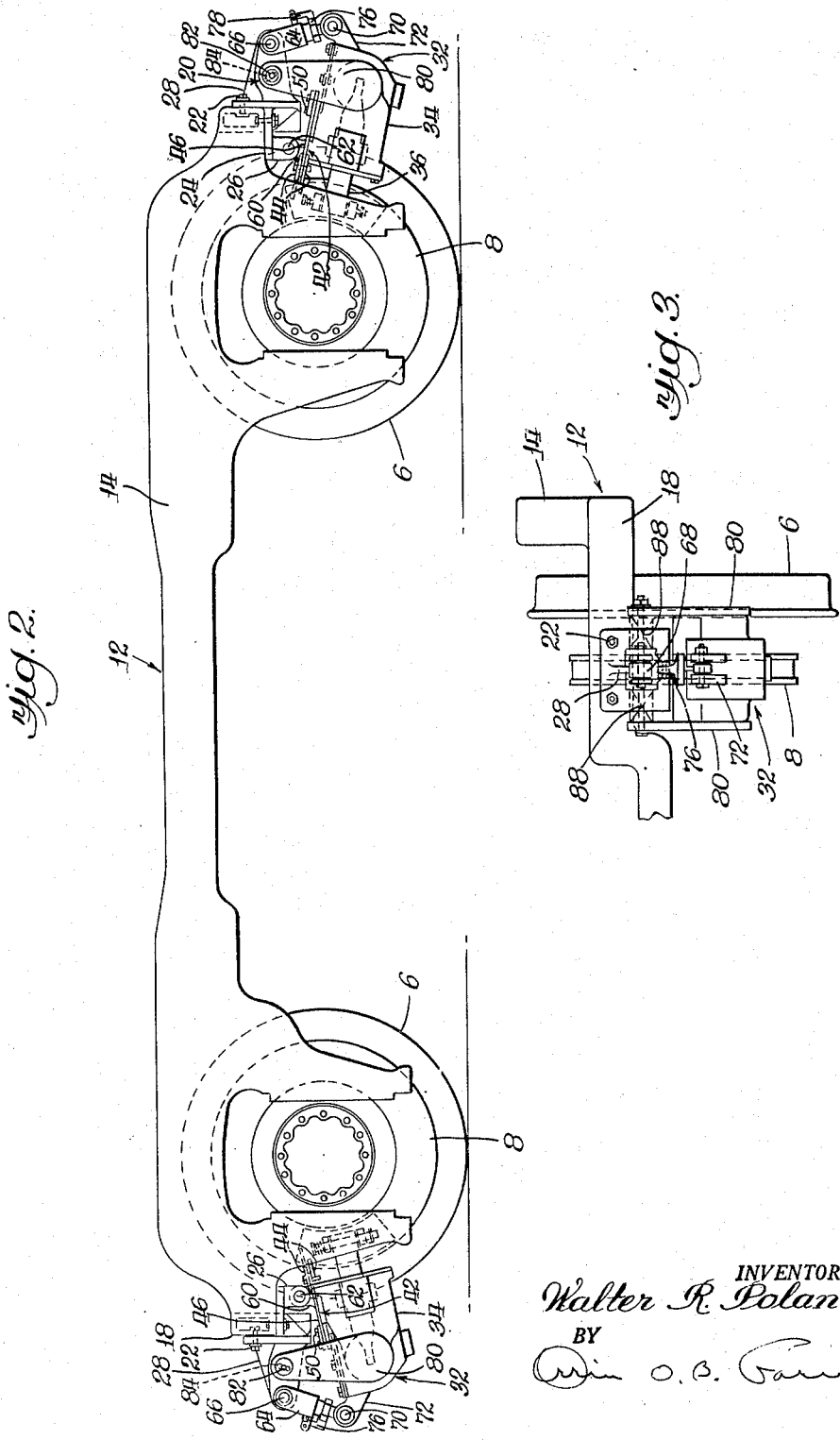

United States Patent Office 2,815,095
Patented Dec. 3, 1957

2,815,095

ROTOR BRAKE SUSPENSION ARRANGEMENT

Walter R. Polanin, Chicago, Ill., assignor to American Steel Foundries, Chicago, Ill., a corporation of New Jersey Application October 29, 1953, Serial No. 389,042

8 Claims. (Cl. 188—59)

The invention relates to a brake arrangement for a railway car truck and more particularly to that type of brake known in the art as a rotor or off-wheel brake.

It is a primary object of the invention to provide a novel rotor brake for a railway car truck and particularly to provide a novel suspension means therefor.

It is an additional object of the invention to provide a novel adjustable suspension for said rotor brake whereby the brake as a unit may be set in perfect alignment with the associated rotor and adjustment may be made to accommodate any change in the relative position of the wheel and axle assembly and supported brake carrying frame.

It is a further object of the invention to suspend the rotor brake unit from the end transom of the associated frame thereby providing easy access for repair and adjustment.

These and other objects of the invention will become apparent in the course of the following description and from an examination of the concerned drawings, wherein:

Figure 1 is a fragmentary plan view of one-half of a railway car truck embodying the important features of the invention, Figure 2 is a fragmentary side elevational view of the structure shown in Figure 1, Figure 3 is an end elevational view of the novel brake arrangement, Figure 4 is a fragmentary side elevational view illustrating a modified form of the invention, and Figure 5 is a fragmentary side elevational view illustrating another modified form of the invention.

Describing the invention in detail, the truck comprises spaced wheel and axle assemblies indicated generally at 2. Each assembly consists of an axle 4 having affixed thereto in a conventional manner the wheels 6. Inboardly of each wheel 6 the assembly mounts a rotor 8, said rotor being secured to the related assembly 2 in any convenient manner such as by the bolts 10, whereby the rotor 8 will rotate with said assembly 2. A truck frame 12 is resiliently supported (not shown) from the wheel and axle assemblies 2, as is well understood by those skilled in the art. The frame 12 comprises side rails 14 interconnected at spaced points intermediate the ends thereof by the transverse members 16, 16. At the opposite ends of the side rails 14 transverse members or end rails 18 are disposed to interconnect said side rails. Each end rail 18 is disposed outboardly of the related wheel and axle assembly 2.

In the preferred form of the invention a bracket 20 is positioned on each end rail 18 in an area immediately adjacent the related rotor 8. The bracket 20 may be rigidly secured to the end rail 18 in any convenient manner such as by the bolts 22. The bracket 20 comprises a horizontal plate 24 which extends inboardly of the end rail 18 and presents on the lower side thereof the depending lugs 26, 26. Additionally, the bracket 20 comprises a vertical plate 28 extending outboardly of the end rail 18 and presenting on opposite sides thereof the bosses 30, 30, said bosses being located approximately centrally of the vertical plate 28. A brake mechanism, indicated generally at 32 comprises a housing 34, said housing having brake levers 36, 36 projecting from one side thereof in such a manner as to embrace the adjacent rotor 8. On the inboard extremities of the brake levers 36 head-brake shoe assemblies 40 are pivotally carried, said assemblies being engageable with opposite faces of the rotor 8 upon actuation of the brake levers 36, as is well understood by those skilled in the art. The brake levers 36 are pivotally carried in the housing in the conventional manner (not shown) and engage therein an actuating cylinder (not shown) which causes the brake levers to pivot upon actuation thereof, whereby the assemblies 40, 40 are urged to clasp the rotor 8 and frictionally decelerate the truck.

A shoe controlling device 42 is provided for each assembly 40. Each device 42 comprises lugs 44 rigidly secured to the assemblies 40 and extending rearwardly therefrom. A link 46 is pivotally attached as at 48 to the lugs 44. The link 46 extends rearwardly to a point 50 whereat each link is pivotally attached to the housing 34. Thus upon actuation of the brake levers 36 the devices 42 maintain the assemblies 40 in paralleled relation to the adjacent surface of the rotor 8 during all pivotal movements of the brake levers 36.

A two point suspension is provided between the brake mechanism 32 and the bracket 20. The two point suspension comprises in the preferred embodiment a lug 60 rigidly connected to and extending upwardly from a central portion of the housing 34 at the inboard end of said housing. Said lug 60 is loosely received between the depending lugs 26 of the bracket 20 and is pivotally attached thereto by means of a pin 62. On the outboard end of the bracket 20 an adjustable arm indicated generally at 64 is provided having its upper extremity pivotally attached to the extremity of the vertical plate 28 as at 66. It should be noted that the arm 64 presents spaced lugs 68, 68 which loosely receive the vertical plate 28 thereby providing lateral flexibility in the pivotal connection 66. The lower extremity of the adjustable arm 64 is pivotally attached as at 70 to spaced lugs 72 which extend rearwardly from and are rigidly attached to the rear extremity of the housing 34. The adjustable arm 64 comprises threadably interconnected members, one of which is provided with a conventional hex head 76 whereby upon rotation of the head 76 the length of the adjustable arm 64 may be varied. The detailed construction of the adjustable arm 76 is disclosed in the copending application of William J. Casey, III, Serial No. 300,941, filed July 25, 1952. A lock 78 is provided to prevent accidental rotation of the hex 76.

The housing 34 is additionally provided with upstanding arms 80, 80, said arms being rigidly secured to opposite sides of said housing. The upper extremities of the arms 80 are disposed to embrace in spaced relation the bosses 30, 30 formed on the vertical plate 28. A pin 82 connects the bosses 30 to the arms 80 by being disposed in aligned apertures in said bosses and arms, respectively. It should be noted that the apertures 84 in the arms 80 which receive said pin 82 are of elongated or slot formation thus providing a limited vertically adjustable connection between the arms 80 and the bracket 20. Referring to Figure 1, it will be seen that flexible members such as coiled springs 88, 88 are positioned to surround the pin 82 and disposed intermediate each arm 80 and the related boss 30 of the bracket 20. The springs 88 add resiliency to the suspension and accommodate flexible relative lateral movement between the brake mechanism 32 and the supporting frame 12 during such times as when the brake assemblies 40 are engaged with the rotor 8.

Attention is now directed to Figure 4 wherein a slightly different arrangement of the two point suspension is employed. It will be noted that the adjustable arm 64 again connects the rear extremity of the bracket 20 and the rear extremity of the housing 32. However, the arms 80 are pivotally connected to the bracket 20, as at 90 centrally of said bracket, while a lug 92 is provided with a limiting pin and slot connection to the inboard end of the bracket as at 94.

In the further embodiment illustrated in Figure 5, the bracket 20 is of slightly different formation and affords a pivotal connection as at 96 between the outboard extremity of said bracket and the rear extremity of the housing 32. The arms 80 are again provided with a pin and slot connection as at 98 to the bracket 20, said slot, however, being directionally changed from that of the preferred embodiment due to the change of the point of pivot of the housing 32. Inboardly of the bracket 20 the adjustable arm 64 is provided with a pivotal connection to the inboard extremity of the bracket 20 and the inboard edge of the housing 32.

Thus it will be seen that the invention provides a novel two point suspension of a rotor brake mechanism from the wheel and axle assembly supported frame of a railway car truck, said novel suspension providing for easy adjustment of the mechanism relative to the engaged rotor to accommodate varying vertical positions between the brake mechanism supporting frame and the rotor carrying wheel and axle assembly. It will further by understood that the preferred embodiment in the invention suspends the brake mechanism from the end rails of the resiliently supported frame thereby providing easy access to the mechanism for adjustment and servicing. However, the mechanism could be suspended in a similar manner from any convenient transverse member of the resiliently supported frame.

I claim:

1. In a rotor brake suspension arrangement for a railway car truck including at least one wheel and axle assembly with a rotor thereon and a truck frame supported on said assembly, the combination of: a brake mounting bracket rigidly secured to the frame adjacent said rotor, a brake mechanism depending from said bracket and including a housing and a pair of brake lever-shoe assemblies fulcrumed to the housing and engageable with opposite sides of the rotor, said housing being disposed below said bracket and presenting a pair of elements spaced from each other longitudinally of the bracket and pivotally connected to the housing on parallel transverse axes, one of said elements being adapted to accommodate the adjustment of the vertical position of the housing relative to the bracket, a pair of upstanding arms on the housing movably connected to the bracket, said arms being spaced transversely of the housing from each other to afford lateral movement for the housing relative to the bracket and resilient means to resist such lateral movement.

2. A brake arrangement according to claim 1, in which said adjustment element is connected to the end of the housing remote from the rotor.

3. A brake arrangement according to claim 1, in which the adjustment element is connected to the end of the housing adjacent the rotor.

4. A brake arrangement according to claim 1, in which the movable connection is positioned between said elements.

5. In a rotor brake arrangement for a railway car truck having a frame supported upon wheel and axle assemblies, a rotor associated with a wheel and axle assembly and rotatable therewith, a brake mounting bracket secured to said frame, a brake mechanism depending from said bracket, said brake mechanism comprising a housing pivotally connected to said bracket and brake lever-shoe assemblies supported on and projecting from said housing to frictionally engage opposite sides of said rotor, the pivotal connections between the housing and the bracket including a pair of elements on the housing spaced longitudinally from each other and pivotally connected to the bracket on parallel axes extending transversely of the housing, a pair of upstanding arms on the housing movably connected to the bracket and spaced transversely of the housing from each other to afford limited lateral movement of the housing relative to the bracket, and means yieldably resisting lateral movement of the housing.

6. In a brake arrangement for a vehicle having at least one wheel and axle assembly with a pair of axially spaced rotatable friction surfaces and a frame supported on said assembly, the combination of: a brake structure depending from the frame and including a pair of brake means fulcrumed thereto and disposed for engagement with the respective friction surfaces, and means to pivotally connect the brake structure to the frame on a pair of parallel axes spaced from each other longitudinally of the structure, said means including means to adjust the vertical position of the structure relative to the frame, and means to limit rotation of the structure about its longitudinal axis.

7. A brake arrangement according to claim 6, wherein said last mentioned means includes a pair of upstanding arms on the brake structure disposed intermediate said pivotal connections and spaced from each other transversely of the structure to afford limited transverse movement of the structure, said arms being nonrigidly connected to the frame.

8. In a brake arrangement for a railroad car truck having a truck frame and brake rotor, a bracket member for attachment to a truck frame, a brake mechanism depending from said bracket member and comprising a housing member, a pair of pivot means spaced longitudinally of the housing member from each other and interconnecting the bracket member and housing member on parallel axes extending transversely of the housing member, brake lever-shoe assemblies projecting from said housing member to frictionally engage opposite sides of the rotor, an adjustment arm interconnecting said bracket and housing members and coacting with said pivot means to vertically adjust the housing member relative to the bracket member, and means accommodating limited lateral movement of the housing member relative to the bracket member, said means comprising abutment arms spaced from each other transversely of the housing member, said arms being rigidly secured to one of said members and movably secured to the other of said members, and resilient means interposed between the bracket member and the abutment arms.

References Cited in the file of this patent
UNITED STATES PATENTS

| | | |
|---|---|---|
| 2,343,342 | Tack | Mar. 7, 1944 |
| 2,359,761 | Helsten | Oct. 10, 1944 |
| 2,377,190 | Tack | May 29, 1945 |
| 2,423,055 | Tarbox | June 24, 1947 |
| 2,627,322 | Tack | Feb. 3, 1953 |
| 2,655,226 | Tack et al. | Oct. 13, 1953 |